US009738754B2

(12) United States Patent
Ebert et al.

(10) Patent No.: US 9,738,754 B2
(45) Date of Patent: *Aug. 22, 2017

(54) ALKOXYLATED POLYETHYENEIMINE WITH A LOW MELTING POINT

(71) Applicant: BASF SE, Ludwigshafen (DE)

(72) Inventors: Sophia Ebert, Mannheim (DE); Björn Ludolph, Ludwigshafen (DE); Frank Huelskoetter, Bad Dürkheim (DE); Kevin Christmas, Mason, OH (US); Stefano Scialla, Rome (IT); Brian J. Loughnane, Fairfield, OH (US); Amy Eichstadt Waun, West Chester, OH (US); Darren Rees, Newcastle upon Tyne (DE)

(73) Assignee: BASF SE, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/914,027

(22) PCT Filed: Jul. 11, 2014

(86) PCT No.: PCT/EP2014/064898
§ 371 (c)(1),
(2) Date: Feb. 24, 2016

(87) PCT Pub. No.: WO2015/028191
PCT Pub. Date: Mar. 5, 2015

(65) Prior Publication Data
US 2016/0222160 A1 Aug. 4, 2016

(30) Foreign Application Priority Data
Aug. 26, 2013 (EP) .................................. 13181708

(51) Int. Cl.
*C08G 65/26* (2006.01)
*C08G 73/02* (2006.01)
*C08G 65/334* (2006.01)

(52) U.S. Cl.
CPC ..... *C08G 65/2624* (2013.01); *C08G 65/3344* (2013.01); *C08G 73/024* (2013.01); *C08G 2650/24* (2013.01)

(58) Field of Classification Search
CPC .......................... C08G 65/2624; C08G 73/024
See application file for complete search history.

(56) References Cited

U.S. PATENT DOCUMENTS

| | | | |
|---|---|---|---|
| 2,792,372 A | 5/1957 | Dickson | |
| 3,907,701 A | 9/1975 | Liebold et al. | |
| 6,143,712 A * | 11/2000 | Beckers | C11D 3/0015 510/517 |
| 7,999,035 B2 * | 8/2011 | Boeckh | C11D 3/3723 525/88 |
| 8,097,579 B2 * | 1/2012 | Danziger | C11D 3/3723 510/360 |
| 8,318,653 B2 * | 11/2012 | Misske | C08G 73/0206 510/360 |
| 8,669,221 B2 * | 3/2014 | Boeckh | C11D 3/3723 510/360 |
| 8,754,027 B2 | 6/2014 | Dobrawa et al. | |
| 8,877,977 B2 | 11/2014 | Strautmann et al. | |
| 9,068,147 B2 | 6/2015 | Dobrawa et al. | |
| 2014/0288265 A1 | 9/2014 | Ebert et al. | |
| 2014/0305339 A1 | 10/2014 | Strautmann et al. | |
| 2015/0057212 A1 | 2/2015 | Hulskotter et al. | |
| 2015/0057213 A1 | 2/2015 | Hulskotter et al. | |
| 2015/0361379 A1 | 12/2015 | Hueffer et al. | |
| 2016/0002572 A1 | 1/2016 | Ebert et al. | |
| 2016/0052867 A1 | 2/2016 | Ebert et al. | |

FOREIGN PATENT DOCUMENTS

| | | |
|---|---|---|
| DE | 2 227 546 A1 | 1/1974 |
| WO | WO-9532272 A1 | 11/1995 |
| WO | WO-99/67352 A1 | 12/1999 |
| WO | WO-02/12180 A1 | 2/2002 |
| WO | WO-2004/024858 A1 | 3/2004 |
| WO | WO-2005/092952 A1 | 10/2005 |
| WO | WO-2006108856 A2 | 10/2006 |
| WO | WO-2009/060059 A2 | 5/2009 |

OTHER PUBLICATIONS

U.S. Appl. No. 14/913,840, filed Feb. 23, 2016, Ebert et al.
International Search Report for PCT/EP2014/064898 mailed Sep. 24, 2014.

* cited by examiner

*Primary Examiner* — Golam M M Shameem
(74) *Attorney, Agent, or Firm* — Drinker Biddle & Reath LLP

(57) ABSTRACT

The present invention relates to water-soluble alkoxylated polyalkyleneimines having an inner block of polyethylene oxide comprising 5 to 18 polyethylene oxide units, a middle block of polyalkylene oxide comprising 1 to 5 polyalkylene oxide units and an outer block of polyethylene oxide comprising 2 to 14 polyethylene oxide units. The middle block is formed from polypropylene oxide units, polybutylene oxide units and/or polypentene oxide units.
In addition, the present invention relates to water-soluble alkoxylated polyamines.

15 Claims, No Drawings

ALKOXYLATED POLYETHYENEIMINE WITH A LOW MELTING POINT

CROSS-REFERENCE TO RELATED APPLICATIONS

This application is a national stage application (under 35 U.S.C. §371) of PCT/EP2014/064898, filed Jul. 11, 2014, which claims benefit of European Application No. 13181708.2, filed Aug. 26, 2013, both of which are incorporated herein by reference in their entirety.

This Patent is subject to a Joint Research and Development Agreement under 35 U.S.C. §103(c)(2)(c). The names of the Parties to the Joint Research and Development Agreement are as follows:
 a. BASF SE, Ludwigshafen, Germany;
 b. Procter & Gamble Co., Cincinnati, Ohio, United States of America.

The present invention relates to water-soluble alkoxylated polyalkyleneimines having an inner block of polyethylene oxide comprising 5 to 18 polyethylene oxide units, a middle block of polyalkylene oxide comprising 1 to 5 polyalkylene oxide units and an outer block of polyethylene oxide comprising 2 to 14 polyethylene oxide units. The middle block is formed from polypropylene oxide units, polybutylene oxide units and/or polypentene oxide units. In addition, the present invention relates to water-soluble alkoxylated polyamines.

WO 99/67352 writes on polyalkyleneimines having a backbone molecular weight of from 600 to 25000 g/mol, wherein the polyamine backbone is first modified by 1 to 10 propyleneoxy units, butyleneoxy units and mixtures thereof, followed by ethyleneoxy units such that the total degree of alkyleneoxylation does not exceed 50 units. These polyalkyleneimines are suitable as soil dispersant in laundry formulations.

WO 2006/108856 reads on amphiphilic water-soluble alkoxylated polyalkyleneimines, wherein the polyamine backbone is first modified by an inner polyalkylene oxide block of propylene oxide, butylene oxide and/or isobutylene oxide, a second middle polyethylene oxide block and an outer polypropylene oxide block.

WO 2009/060059 relates to amphiphilic water-soluble alkoxylated polyalkyleneimines having an inner polyethylene oxide block comprising 20 to 50 polyethylene oxide units and an outer polypropylene oxide block comprising 10 to 50 polypropylene oxide units.

DE 2 227 546 A1 describes polyethyleneimines which have initially been ethoxylated and then propoxylated as breakers for crude oil emulsions.

WO 95/32272 describes ethoxylated and/or propoxylated polyalkyleneamine polymers to boost soil dispersing performance, wherein said polymers have an average ethoxylation/propoxylation of from 0.5 to 10 per nitrogen.

Cleaning compositions comprising alkoxylated polyalkyleneimines are also known. The alkoxylated polyalkyleneimines help to provide cleaning benefits, such as soil anti-redeposition benefits.

When the polyamine backbone of ethoxylated polyalkyleneimines or polyamines is modified with a total of 14 polyethylene oxide units or more per nitrogen atom, these polyalkylenimines or polyamines are usually solid at room temperature which causes serious handling difficulties. These polyalkyleneimines or polyamines have thus to be first molten or incorporated in aqueous solution in order to be further processed. Ethoxylated polyalkyleneimine or polyamines which would be liquid at room temperature would thus be easier to handle.

It is thus an object of the invention to provide ethoxylated polyalkylenimines and polyamines wherein the polyamine backbone has been modified by 14 or more polyethylene oxide units per nitrogen atom and which are liquid at or below room temperature, i.e. at or below 25° C.

It has surprisingly been found that the shortcomings of the previously described ethoxylated polyalkyleneimines can be overcome by adding a middle block of propylene oxide, butylene oxide and/or pentene oxide to the polyethylene oxide block that is condensed with the polyamine backbone of the polyalkylenimine. It has also surprisingly been found that the shortcomings of the previously described ethoxylated polyamines can be overcome by adding a middle block of propylene oxide, butylene oxide and/or pentene oxide to the polyethylene oxide block that is condensed with the polyamine backbone.

The problem has thus been solved by a water-soluble alkoxylated polyalkylenimine or polyamine of the general formula I

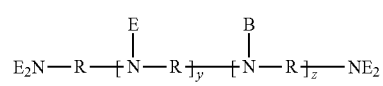

in which the variables are each defined as follows:

R represents identical or different, linear or branched $C_2$-$C_{12}$-alkylene radicals or an etheralkyl unit of the following formula:

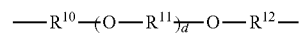

in which the variables are each defined as follows:
$R^{10}$, $R^{11}$, $R^{12}$ represent identical or different, linear or branched $C_2$-$C_6$-alkylene radicals and d is an integer having a value in the range of from 0 to 50; wherein if d is 0 then also y and z are 0;

B represents a continuation of the alkoxylated polyalkylenimine by branching

E is an alkylenoxy unit of the formula II

in which the variables are each defined as follows:
$R^1$ represents 1,2-propylene, 1,2-butylene and/or 1,2-pentene;
$R^2$ represents hydrogen and/or $C_1$-$C_{22}$-alkyl and/or $C_7$-$C_{22}$ aralkyl;
y and z are each from 0 to 150,
m is an integer having a value in the range of from 5 to 18;
n is an integer having a value in the range of from 1 to 5;
p is an integer having a value in the range of from 2 to 14.

In a preferred embodiment R represents identical or different, linear or branched $C_2$-$C_{12}$-alkylene radicals. In another preferred embodiment, $R^2$ represents hydrogen and/or $C_1$-$C_4$-alkyl.

In a preferred embodiment, the sum of y+z is at least 1. In another preferred embodiment, y and z are both 0.

In a further preferred embodiment, $R^{10}$, $R^{11}$, $R^{12}$ represent identical or different, linear or branched $C_2$-$C_6$-alkylene radicals and d is an integer having a value in the range of from 0 to 50, wherein if d is 0 then also y and z are 0.

The inventive alkoxylated polyalkylenimines have a basic skeleton, i.e. a polyamine backbone, which comprises primary, secondary and tertiary amine nitrogen atoms which are joined by alkylene radicals R and are in the form of the following moieties in random arrangement:

primary amino moieties which terminate the main chain and the side chains of the basic skeleton and whose hydrogen atoms are subsequently replaced by alkylenoxy units:

secondary amino moieties whose hydrogen atom is subsequently replaced by alkylenoxy units:

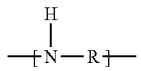

tertiary amino moieties which branch the main chain and the side chains:

The inventive alkoxylated polyamines are preferably, but not limited to, alkoxylated hexamethylenediamine, alkoxylated ethylenediamine, alkoxylated 1,3-diaminopropane, alkoxylated neopentanediamine, alkoxylated diethylentriamine, alkoxylated octamethylenediamine, alkoxylated 1,2-propylenediamine or alkoxylated isophoronediamine.

Before the alkoxylation, the polyalkylenimine or polyamine has an average molecular weight $M_w$ of from 50 to 10 000 g/mol, preferably from 250 to 10 000 g/mol. The sum x+y+z of the repeating units of the primary, secondary and tertiary amino moieties means a total number of alkylenimine units which corresponds to these molecular weights.

The molecular weight $M_w$ of the polyalkylenimine is preferably from 250 to 5000 g/mol and more preferably from 400 to 3000 g/mol.

The molecular weight $M_w$ of the polyamine is preferably from 50 to 10 000 g/mol and more preferably from 100 to 10 000 g/mol.

The R radicals connecting the amine nitrogen atoms may be identical or different, linear or branched $C_2$-$C_{12}$-alkylene radicals, preferably $C_2$-$C_6$-alkylene radicals. A preferred branched alkylene is 1,2-propylene. A particularly preferred alkylene radical R is ethylene or hexamethylene.

The hydrogen atoms of the primary and/or secondary amino groups of the basic polyalkylenimine or polyamine skeleton are replaced by alkylenoxy units of the formula $$-(CH_2CH_2O)_{\overline{m}}(R^1-O)_{\overline{n}}(CH_2CH_2O)_{\overline{p}}R^2 \quad \text{II}$$

In this formula, the variables are each defined as follows:
$R^1$ represents 1,2-propylene, 1,2-butylene and/or 1,2-pentene;
$R^2$ represents hydrogen and/or $C_1$-$C_{22}$-alkyl and/or $C_7$-$C_{22}$ aralkyl;
y and z are each from 0 to 150,
m is an integer having a value in the range of from 5 to 18;
n is an integer having a value in the range of from 1 to 5;
p is an integer having a value in the range of from 2 to 14.

In a preferred embodiment, the sum of y+z is at least 1.
In another preferred embodiment, y and z are both 0.

A preferred modified polyalkyleneimine has the general structure of formula (III):

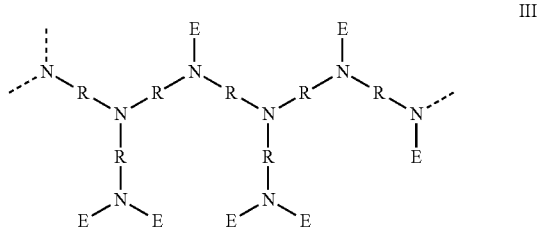

wherein R represents identical or different, linear or branched $C_2$-$C_6$-alkylene radicals and E is an alkylenoxy unit of the formula II

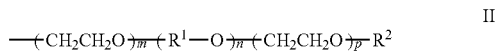

in which the variables are each defined as follows:
$R^1$ represents 1,2-propylene, 1,2-butylene and/or 1,2-pentene;
$R^2$ represents hydrogen and/or $C_1$-$C_{22}$-alkyl and/or $C_7$-$C_{22}$ aralkyl;
y and z are each from 0 to 150, where the sum of y+z is at least 1
m is an integer having a value in the range of from 5 to 18;
n is an integer having a value in the range of from 1 to 5;
p is an integer having a value in the range of from 2 to 14.

A preferred modified polyalkyleneimine has the general structure of formula (IV), Formula IV

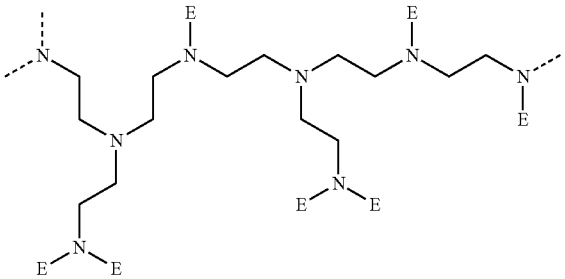

wherein E is an alkylenoxy unit of the formula II

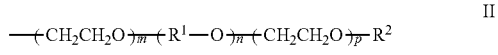

in which the variables are each defined as follows:
$R^1$ represents 1,2-propylene, 1,2-butylene and/or 1,2-pentane;
$R^2$ represents hydrogen and/or $C_1$-$C_{22}$-alkyl and/or $C_7$-$C_{22}$ aralkyl;
y and z are each from 0 to 150, where the sum of y+z is at least 1
m is an integer having a value in the range of from 5 to 18;
n is an integer having a value in the range of from 1 to 5;
p is an integer having a value in the range of from 2 to 14.

A preferred modified polyamine has the general structure of formula (V)

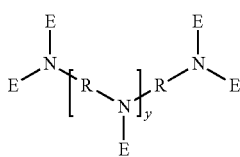
(V)

wherein R is identical or different selected from linear or branched $C_2$-$C_{12}$-alkylene radicals such as 1,2-ethylene; 1,2-propylene; 1,3-propylene; 1,4-butylene; 1,6-hexylene; 1,8-octylene; wherein y is from 0 to 150 and wherein E is an alkylenoxy unit of the formula II

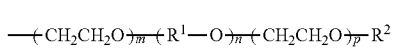
II in which the variables are each defined as follows:
$R^1$ represents 1,2-propylene, 1,2-butylene and/or 1,2-pentene;
$R^2$ represents hydrogen and/or $C_1$-$C_{22}$-alkyl and/or $C_7$-$C_{22}$ aralkyl;
m is an integer having a value in the range of from 5 to 18;
n is an integer having a value in the range of from 1 to 5;
p is an integer having a value in the range of from 2 to 14.

In another preferred embodiment, the preferred modified polyamine has the general structure of formula (VI)

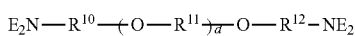
(VI)

Wherein $R^{10}$, $R^{11}$, $R^{12}$ represent identical or different, linear or branched $C_2$-$C_6$-alkylene radicals and d is an integer having a value in the range of from 0 to 50;

In a preferred embodiment d is from 1 to 10, and $R^{10}$, $R^{11}$, $R^{12}$ are independently selected from linear or branched $C_2$ to $C_4$ alkylene radicals, preferably selected from 1,2-ethylene; 1,2-propylene; 1,3-propylene; 1,2-butylene; 1,4-butylene and wherein E is an alkylenoxy unit of the formula II

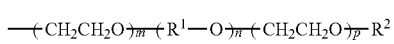
II in which the variables are each defined as follows:
$R^1$ represents 1,2-propylene, 1,2-butylene and/or 1,2-pentene;
$R^2$ represents hydrogen and/or $C_1$-$C_{22}$-alkyl and/or $C_7$-$C_{22}$ aralkyl;
m is an integer having a value in the range of from 5 to 18;
n is an integer having a value in the range of from 1 to 5;
p is an integer having a value in the range of from 2 to 14.

The inventive alkoxylated polyalkylenimines or alkoxylated polyamines may also be quaternized. A suitable degree of quaternization is up to 100%, in particular from 10 to 95% The quaternization is effected preferably by introducing $C_1$-$C_{22}$-alkyl groups, $C_1$-$C_4$-alkyl groups and/or $C_7$-$C_{22}$ aralkyl groups and may be undertaken in a customary manner by reaction with corresponding alkyl halides and dialkyl sulfates.

The quaternization may be advantageous in order to adjust the alkoxylated polyalkylenimines or the alkoxylated polyamines to the particular composition such as cosmetic compositions in which they are to be used, and to achieve better compatibility and/or phase stability of the formulation.

The quaternization of alkoxylated polyalkylenimines or alkoxylated polyamines is achieved preferably by introducing $C_1$-$C_{22}$ alkyl, $C_1$-$C_4$-alkyl groups and/or $C_7$-$C_{22}$ aralkyl, aryl or alkylaryl groups and may be undertaken in a customary manner by reaction with corresponding alkyl-, aralkyl-halides and dialkylsulfates, as described for example in WO 09/060059.

Quaternization can be accomplished, for example, by reacting an alkoxylated polyamine or alkoxylated polyalkylenimine with an alkylation agent such as a $C_1$-$C_4$-alkyl halide, for example with methyl bromide, methyl chloride, ethyl chloride, methyl iodide, n-butyl bromide, isopropyl bromide, or with an aralkyl halide, for example with benzyl chloride, benzyl bromide or with a di-$C_1$-$C_{22}$-alkyl sulfate in the presence of a base, especially with dimethyl sulfate or with diethyl sulfate. Suitable bases are, for example, sodium hydroxide and potassium hydroxide.

The amount of alkylating agent determines the amount of quaternization of the amino groups in the polymer, i.e. the amount of quaternized moieties.

The amount of the quaternized moieties can be calculated from the difference of the amine number in the non-quaternized amine and the quaternized amine.

The amine number can be determined according to the method described in DIN 16945.

The reaction can be carried out without any solvent. However, a solvent or diluent like water, acetonitrile, dimethylsulfoxide. N-Methylpyrrolidone, etc. may be used. The reaction temperature is usually in the range from 10° C. to 150° C. and is preferably from 50° C. to 100° C.

In a preferred embodiment, the inventive quaternized polyalkylenimines or polyamines can be sulfatized or transsulfatized if $R^2$ in formula II is hydrogen. Preferably, the inventive quaternized polyalkylenimines or quaternized polyamines are sulfatized or transsulfatized. The quaternized polyalkylenimines can be sulfatized or transsulfatized in accordance with methods known in the art, e.g. as described in WO 05/092952. Sulfatation or transsulfatation can be achieved with e.g. dimethylsulfate.

The sulfation of the polymers according to the present invention can be affected by a reaction with sulfuric acid or with a sulfuric acid derivative. Suitable sulfation agents are e.g. sulfuric acid (preferably 75% to 100% strength, more preferably 85% to 98% strength), oleum, $SO_3$, chlorosulfonic acid, sulfuryl chloride, amidosulfuric acid, and the like. If sulfuryl chloride is being used as sulfation agent, the remaining chlorine is being replaced by hydrolysis after sulfation. The sulfation agent is frequently used in equimolar amounts or in excess, e.g. 1 to 1.5 moles per OH-group present in the polymer. But, the sulfation agent can also be used in sub-equimolar amounts. The sulfation can be effected in the presence of a solvent. A suitable solvent is e.g. toluene. After the sulfation the reaction mixture is generally neutralized and worked up in a conventional manner.

As described above, it is also possible to quaternize and transsulfatize alkoxylated polyamines or alkoxylated polyalkylenimines. A sulfation process can be described as transsulfation process, when an alkoxylated polyamine or an alkoxylated polyalkylenimine is first reacted with a di-$C_1$-$C_4$-alkyl sulfate to form a quaternized polyamine and a sulfating species as counterion, and then followed by reacting the hydroxyl groups with the sulfating species, leading to a quaternized and sulfated alkoxylated polyamine or alkoxylated polyalkylenimine. Examples for transsulfation processes are described in WO 04/024858 or WO 02/12180.

Combined quaternization and sulfatization can be achieved, e.g., by first reacting an alkoxylated polyalkylenimine or alkoxylated polyamine with a di-$C_1$-$C_4$-alkyl sulfate in the presence of a base, then acidifying the reaction mixture obtained from quaternization, for example with a carboxylic acid, such as methane sulfonic acid, or with a mineral acid such as phosphoric acid, sulfuric acid or hydrochloric acid. The process is conducted at a pH less than 6, preferably less than pH 3, at temperatures from 0° C.-200° C., preferably 50-150° C. After the transsulfation the reaction mixture is generally neutralized.

The inventive alkoxylated polyalkylenimines or alkoxylated polyamines may be prepared in a known manner.

One preferred procedure consists in initially undertaking only an incipient alkoxylation of the polyalkylenimine or the polyamine in a first step. Thus, the present invention further relates to a process for preparing a water-soluble alkoxylated polyalkyleneimine or a polyamine according to the present invention, wherein a polyalkyleneimine or a polyamine is first reacted with ethylene oxide than with propylene oxide or butylene oxide and then with ethylene oxide.

In this step, the polyalkylenimine or polyamine is reacted only with a portion of the total amount of ethylene oxide used, which corresponds to about 1 mole of ethylene oxide per mole of NH moiety.

In a preferred embodiment, per mol of N—H functionalities in the polyalkyleneimine or polyamine the polyalkyleneimine or polyamine is reacted with 5 to 18 moles ethylene oxide then with 1 to 5 moles propylenoxide or butylene oxide and then with 2 to 14 moles ethylene oxide.

In another preferred embodiment, the polyalkylenimine is a polyethyleneimine or the polyamine is a hexamethylenediamine This reaction is undertaken generally in the absence of a catalyst in aqueous solution at from 70 to 200° C., preferably from 80 to 160° C., under a pressure of up to 10 bar, in particular up to 8 bar.

In a second step, the further alkoxylation is then effected by subsequent reaction i) with the remaining amount of ethylene oxide; ii) with propylene oxide or in the case of a modification by higher alkylene oxide with butylene oxide and/or pentene oxide; and at last iii) with ethylene oxide.

Said second step of the alkoxylation reaction is undertaken typically in the presence of a basic catalyst. Examples of suitable catalysts are alkali metal and alkaline earth metal hydroxides such as sodium hydroxide, potassium hydroxide and calcium hydroxide, alkali metal alkoxides, in particular sodium and potassium $C_1$-$C_4$-alkoxides, such as sodium methoxide, sodium ethoxide and potassium tert-butoxide, alkali metal and alkaline earth metal hydrides such as sodium hydride and calcium hydride, and alkali metal carbonates such as sodium carbonate and potassium carbonate. Preference is given to the alkali metal hydroxides and the alkali metal alkoxides, particular preference being given to potassium hydroxide and sodium hydroxide. Typical use amounts for the base are from 0.05 to 10% by weight, in particular from 0.5 to 2% by weight, based on the total amount of polyalkylenimine or polyamine and alkylene oxide.

The second step of alkoxylation may be undertaken in substance (variant a)) or in an organic solvent (variant b)). The process conditions specified below may be used both for steps of the alkoxylation reaction.

In variant a), the aqueous solution of the incipiently alkoxylated polyalkylenimine or polyamine obtained in the first step, after addition of the catalyst, is initially dewatered. This can be done in a simple manner by heating to from 80 to 150° C. and distilling off the water under a reduced pressure of from less than 30 mbar. The subsequent reactions with the alkylene oxides are effected typically at from 70 to 200° C., preferably from 100 to 180° C., and at a pressure of up to 10 bar, in particular up to 8 bar, and a continued stirring time of from about 0.5 to 4 h at from about 100 to 160° C. and constant pressure follows in each case.

Suitable reaction media for variant b) are in particular nonpolar and polar aprotic organic solvents. Examples of particularly suitable nonpolar aprotic solvents include aliphatic and aromatic hydrocarbons such as hexane, cyclohexane, toluene and xylene. Examples of particularly suitable polar aprotic solvents are ethers, in particular cyclic ethers such as tetrahydrofuran and dioxane, N,N-dialkylamides such as dimethylformamide and dimethylacetamide, and N-alkyllactams such as N-methylpyrrolidone. It is of course also possible to use mixtures of these aprotic solvents. Preferred solvents are xylene and toluene.

In variant b) too, the solution obtained in the first step, after addition of catalyst and solvent, is initially dewatered, which is advantageously done by separating out the water at a temperature of from 120 to 180° C., preferably supported by a gentle nitrogen stream. The subsequent reaction with the alkylene oxide may be effected as in variant a).

In variant a), the alkoxylated polyalkylenimine or polyamine is obtained directly in substance and may be converted if desired to an aqueous solution. In variant b), the organic solvent is typically removed and replaced by water. The products may of course also be isolated in substance.

In another preferred embodiment, the alkoxylated polyalkylenimine or alkoxylated polyamine is additionally quaternized and/or sulfatized.

The inventive polymers have a melting point lower than 25° C., so that they are liquid at room temperature. This enables an easier handling since they do not have to be molten or solubilized in aqueous solution before further processing.

The inventive alkoxylated polyalkylenimines or alkoxylated polyamines can be added to cosmetics formulations, as crude oil emulsion breaker, in pigment dispersions for ink jet inks, formulations for electro plating, in cementitious compositions.

The inventive alkoxylated polyalkylenimines or alkoxylated polyamines are present in said formulations at a concentration of 0.1 to 5 weight %, preferably at a concentration of 0.5 to 2 weight %.

The inventive alkoxylated polyalkylenimines or alkoxylated polyamines can also be added to a cleaning composition comprising from about 1% to about 70% by weight of a surfactant system. The inventive alkoxylated polyalkylenimines or alkoxylated polyamines may be present in a cleaning composition at a concentration of from about 0.1% to about 5% by weight of the composition, or at a concentration of from about 0.5% to about 2% by weight of the composition.

Cleaning Composition

As used herein the phrase "cleaning composition" includes compositions and formulations designed for cleaning soiled material. Such compositions include but are not limited to, laundry cleaning compositions and detergents, fabric softening compositions, fabric enhancing compositions, fabric freshening compositions, laundry prewash, laundry pretreat, laundry additives, spray products, dry cleaning agent or composition, laundry rinse additive, wash additive, postrinse fabric treatment, ironing aid, dish washing compositions, hard surface cleaning compositions, unit dose formulation, delayed delivery formulation, detergent contained on or in a porous substrate or nonwoven sheet, and other suitable forms that may be apparent to one skilled in the art in view of the teachings herein. Such compositions may be used as a pre-laundering treatment, a post-laundering treatment, or may be added during the rinse or wash cycle of the laundering operation. The cleaning compositions may have a form selected from liquid, powder, single-phase or multi-phase unit dose, pouch, tablet, gel, paste, bar, or flake.

The cleaning compositions comprise a surfactant system in an amount sufficient to provide desired cleaning properties. In some embodiments, the cleaning composition comprises, by weight of the composition, from about 1% to about 70% of a surfactant system. In other embodiments, the liquid cleaning composition comprises, by weight of the composition, from about 2% to about 60% of the surfactant system. In further embodiments, the cleaning composition comprises, by weight of the composition, from about 5% to about 30% of the surfactant system. The surfactant system may comprise a detersive surfactant selected from anionic surfactants, nonionic surfactants, cationic surfactants, zwitterionic surfactants, amphoteric surfactants, ampholytic surfactants, and mixtures thereof. Those of ordinary skill in the art will understand that a detersive surfactant encompasses any surfactant or mixture of surfactants that provide cleaning, stain removing, or laundering benefit to soiled material.

The cleaning compositions may also contain adjunct cleaning additives. Suitable adjunct cleaning additives include builders, structurants or thickeners, clay soil removal/anti-redeposition agents, polymeric soil release agents, polymeric dispersing agents, polymeric grease cleaning agents, enzymes, enzyme stabilizing systems, bleaching compounds, bleaching agents, bleach activators, bleach catalysts, brighteners, dyes, hueing agents, dye transfer inhibiting agents, chelating agents, suds supressors, softeners, and perfumes.

EXAMPLES

In the examples, the following abbreviations are used:

EO ethylene oxide

PO propylene oxide

PEI600 polyethylenimine with an average molecular weight of 600 g/mol x EO/NH x mole ethylene oxide per mole of NH-functionality y PO/NH y mole propylene oxide per mole of NH-functionality Example 1

PEI600+17 EO/NH+2 PO/NH+2 EO/NH a) PEI600+1 EO/NH

A 5 l autoclave was charged with 1943.0 g of a polyethylenimine with an average molecular weight of 600 g/mol and 97.0 g water. The reactor was purged three times with nitrogen and heated to 110° C. 1789.0 g ethylene oxide were added within 14 hours. To complete the reaction, the reaction mixture was allowed to post-react for 5 hours. Water and volatile compounds were removed in vacuo at 90° C. A highly viscous yellow oil (3688.0 g, water content: 2.6%, pH: 11.05 (5% in water)) was obtained.

b) PEI600+17 EO/NH+2 PO/NH+2 EO/NH

Product from example 1a) (76.3 g) and 3.58 g potassium hydroxide (50% in water) was placed in a 2 l autoclave. The mixture was heated under vacuum (<10 mbar) to 120° C. and stirred for 2 hours to remove water. The reactor was purged three times with nitrogen and the mixture was heated to 140° C. 637.6 g ethylene oxide were added within 7 hours, followed by addition of 104.4 g propylene oxide within 1.5 hours and afterwards 79.2 g ethylene oxide within 1.5 h. To complete the reaction, the mixture was allowed to post-react for 5 hours. Volatile compounds were removed in vacuo. 890.0 g of a slightly turbid liquid were obtained (melting point: 19.1° C.). Melting points were measured according to DIN 51007.

Example 2

PEI600+13 EO/NH+2 PO/NH+6 EO/NH

Product from example 1a) (80.0 g) and 3.75 g potassium hydroxide (50% in water) was placed in a 2 l autoclave. The mixture was heated under vacuum (<10 mbar) to 120° C. and stirred for 2 hours to remove water. The reactor was purged three times with nitrogen and the mixture was heated to 140° C. 502.2 g ethylene oxide were added within 6 hours, followed by addition of 109.4 g propylene oxide within 1.5 hours and afterwards 249.0 g ethylene oxide within 3.5 h. To complete the reaction, the mixture was allowed to post-react for 5 hours. Volatile compounds were removed in vacuo. 938.0 g of a slightly turbid liquid were obtained (melting point: 6.8° C.).

Example 3

PEI600+11 EO/NH+2 PO/NH+8 EO/NH

Product prepared as described in example 1a) (80.2 g, 92.7% in water) and 3.58 g potassium hydroxide (50% in water) was placed in a 2 l autoclave. The mixture was heated under vacuum (<10 mbar) to 120° C. and stirred for 2 hours to remove water. The reactor was purged three times with nitrogen and the mixture was heated to 140° C. 399.9 g ethylene oxide were added within 5 hours, followed by addition of 104.4 g propylene oxide within 1.5 hours and afterwards 316.8 g ethylene oxide within 3.5 h. To complete the reaction, the mixture was allowed to post-react for 5 hours. Volatile compounds were removed in vacuo. 895.0 g of a slightly turbid liquid were obtained (melting point: 8.3° C., viscosity (20° C.) 2126 mPas, cloud point: 87° C. Cloud points were measured according to DIN EN 1890, method B.

Example 4 a) PEI600+11 EO/NH+3 PO/NH+8 EO/NH

Product prepared as described in example 1a) (76.3 g, 97.4% in water) and 3.8 g potassium hydroxide (50% in water) was placed in a 2 l autoclave. The mixture was heated under vacuum (<10 mbar) to 120° C. and stirred for 2 hours to remove water. The reactor was purged three times with nitrogen and the mixture was heated to 140° C., 400.0 g ethylene oxide were added within 6 hours, followed by addition of 156.6 g propylene oxide within 2 hours and afterwards 316.8 g ethylene oxide within 5 h. To complete the reaction, the mixture was allowed to post-react for 5 hours. Volatile compounds were removed in vacuo. 945.0 g of a light brown liquid were obtained (melting point: 3.8° C.)

b) PEI600+11 EO/NH+3 PO/NH+8 EO/NH, Quaternized with Dimethylsulfate

In a 500 ml reaction vessel with a nitrogen inlet, 160.0 g product from example 4a) (PEI600+11 EO/NH+3 PO/NH+8 EO/NH) was heated to 70° C. under a constant stream of nitrogen. 17.40 g dimethyl sulfate was added dropwise at 70-75° C. and the reaction mixture was stirred for two hours at 70° C. under nitrogen. After cooling to room temperature, the pH was adjusted with 3.7 g sodium hydroxide (50% in water) to 9.2 (measured 10% in water). 185.0 g of a yellow liquid were obtained (amine value: 0.03 mgKOH/g, melting point: 5.0° C.). The degree of quaternization was 96%.

c) PEI600+11 EO/NH+3 PO/NH+8 EO/NH, Quaternized with Dimethylsulfate, Transsulfatized In a reaction vessel 70.0 g of product obtained in example 4b) was heated under nitrogen atmosphere to 60° C. 2.0 g sulfuric acid (96%) was added at 60° C. to adjust the pH to 2.0 (measured 10% in water). The temperature was raised to 90° C. and the mixture was set under vacuum (15 mbar) for 3 hours. After cooling to 60° C. the pH was adjusted with 5.4 g sodium hydroxide (50% solution in water) to 9.3. 69.0 g of a brown liquid were obtained (melting point: 7.0° C., water: 0.5%)

Example 5

PEI600+9 EO/NH+2 PO/NH+10 EO/NH

Product from example 1a) (76.3 g, 97.4% in water) and 3.58 g potassium hydroxide (50% in water) was placed in a 2 l autoclave. The mixture was heated under vacuum (<10 mbar) to 120° C. and stirred for 2 hours to remove water. The reactor was purged three times with nitrogen and the mixture was heated to 140° C. 320.7 g ethylene oxide were added within 4 hours, followed by addition of 104.4 g propylene oxide within 1.5 hours and afterwards 396.0 g ethylene oxide within 6 h. To complete the reaction, the mixture was allowed to post-react for 5 hours. Volatile compounds were removed in vacuo. 895.0 g of a slightly brown liquid were obtained (melting point: 7.7° C.).

Example 6

PEI600+5 EO/NH+2 PO/NH+14 EO/NH

Product from example 1a) (76.3 g, 97.4% in water) and 3.6 g potassium hydroxide (50% in water) was placed in a 2 l autoclave. The mixture was heated under vacuum (<10 mbar) to 120° C. and stirred for 2 hours to remove water. The reactor was purged three times with nitrogen and the mixture was heated to 140° C. 162.4 g ethylene oxide were added within 2 hours, followed by addition of 104.4 g propylene oxide within 1.5 hours and afterwards 554.4 g ethylene oxide within 8 h. To complete the reaction, the mixture was allowed to post-react for 5 hours. Volatile compounds were removed in vacuo. 896.0 g of a slightly turbid liquid were obtained (melting point: 17.7° C.).

Comparative Example 1 (CE 1)

PEI600+20 EO/NH

Product prepared as described in example 1a) (144.6 g, 92.7% in water) and 4.34 g potassium hydroxide (50% in water) was placed in a 2 l autoclave. The mixture was heated under vacuum (<10 mbar) to 120° C. and stirred for 2 hours to remove water. The reactor was purged three times with nitrogen and the mixture was heated to 140° C. 1470.7 g ethylene oxide were added within 14 hours. To complete the reaction, the mixture was allowed to post-react for 5 hours. Volatile compounds were removed in vacuo. 1615.0 g of a slightly brown solid were obtained (melting point: 35.4° C.).

Comparative Example 2 (CE 2)

PEI600+19 EO/NH+2 PO/NH

Product prepared as described in example 1a) (80.2 g, 92.7% in water) and 3.58 g potassium hydroxide (50% in water) was placed in a 2l autoclave. The mixture was heated under vacuum (<10 mbar) to 120° C. and stirred for 2 hours to remove water. The reactor was purged three times with nitrogen and the mixture was heated to 140° C. 716.8 g ethylene oxide were added within 8 hours, followed by addition of 104.4 g propylene oxide within 1 hour. To complete the reaction, the mixture was allowed to post-react for 5 hours. Volatile compounds were removed in vacuo. 897.0 g of a slightly brown solid were obtained (melting point: 28.7° C.).

Comparative Example 3 (CE 3)

PEI600+2.5 EO/NH+2 PO/NH+16.5 EO/NH

Product similar to example 1a) (80.2 g, 92.7% in water) and 3.58 g potassium hydroxide (50% in water) was placed in a 2 l autoclave. The mixture was heated under vacuum (<10 mbar) to 120° C. and stirred for 2 hours to remove water. The reactor was purged three times with nitrogen and the mixture was heated to 140° C. 63.4 g ethylene oxide were added within 1 hour, followed by addition of 104.4 g propylene oxide within 1 hour and followed by addition of 653.4 g ethylene oxide within 6 hours. To complete the reaction, the mixture was allowed to post-react for 5 hours. Volatile compounds were removed in vacuo. 896.0 g of a slightly brown solid were obtained (melting point: 27.2° C.).

Comparative Example 4 (CE 4)

PEI600+2 PO/NH+19 EO/NH
a) PEI600+1 PO/NH

A 2 l autoclave was charged with 430.0 g of a polyethylenimine with an average molecular weight of 600 g/mol and 21.5 g water. The reactor was purged three times with nitrogen and heated to 110° C. 522.0 g propylene oxide were added within 10 hours. To complete the reaction, the reaction mixture was allowed to post-react for 5 hours. Water and volatile compounds were removed in vacuo at 90° C. A highly viscous yellow oil (970.0 g, water content: 2.6%) was obtained.

b) PEI600+2 PO/NH+19 EO/NH

Product from example 5a) (76.2 g, 97.4% in water) and 3.18 g potassium hydroxide (50% in water) was placed in a 2 l autoclave. The mixture was heated under vacuum (<10 mbar) to 120° C. and stirred for 2 hours to remove water. The reactor was purged three times with nitrogen and the mixture was heated to 140° C. 51.04 g propylene oxide were added within 10 minutes, followed by addition of 668.8 g ethylene oxide within 10 hours. To complete the reaction, the mixture was allowed to post-react for 5 hours. Volatile compounds were removed in vacuo. 793.0 g of a light brown solid were obtained (melting point: 35.8° C.).

Comparative Example 5 (CE 5)

HMDA+24 EO/NH
a) HMDA+1 EO/NH

A 2 l autoclave was charged with 408.0 g hexamethylene diamine (HMDA) and 20.4 g water. The autoclave was purged three times with nitrogen and heated to 110° C. 618.0 g ethylene oxide were added within 6 hours. To complete the reaction, the reaction mixture was allowed to post-react for 5 hours at 110° C. Water and volatile compounds were removed in vacuo at 90° C. A highly viscous yellow oil (1019 g, water content: 0.2%, pH: 11.05 (5% in water)) was obtained.

b) HMDA+5 EO/NH

Product from comparative example 5a) (292.2 g) and 8.8 g potassium hydroxide (50% in water) was placed in a 2 l autoclave. The mixture was heated under vacuum (<10 mbar) to 100° C. and stirred for 2 hours to remove water. The reactor was purged three times with nitrogen and the mixture was heated to 140° C. 704.0 g ethylene oxide were added within 7 hours. To complete the reaction, the mixture was allowed to post-react for 5 hours. Volatile compounds were removed in vacuo, 999.0 g of a brown liquid were obtained.

c) HMDA+24 EO/NH

Product from comparative example 5b) (348.7 g) was placed in a 2 l autoclave. The mixture was heated under vacuum (<10 mbar) to 100° C. and stirred for 0.5 hours to remove traces of water. The reactor was purged three times with nitrogen and the mixture was heated to 140° C. 1171.7 g ethylene oxide were added within 10 hours. To complete the reaction, the mixture was allowed to post-react for 5 hours. Volatile compounds were removed in vacuo. 1515.0 g of a light brown solid were obtained (melting point: 42.4° C.).

d) HMDA+24EO/NH, Quaternized with Dimethyl Sulfate

Product from comparative example 5 c) was quaternized as described in WO 04/024858. A brown solid was obtained (melting point 43.6° C.).

e) HMDA+24EO/NH, Quaternized with Dimethyl Sulfate, Transsulfatized

Product from comparative example 5 c) was quaternized and transsulfatized as described in WO 04/024858. A brown solid was obtained (melting point 41.5° C.).

Comparative Example 6 (CE 6)

HMDA+2 PO/NH+22 ED/H
a) HMDA+1 PO/NH

A 2 l autoclave was charged with 232.4 g hexamethylene diamine (HMDA) and 11.6 g water. The autoclave was purged three times with nitrogen and heated to 110° C. 464.0 g propylene oxide were added within 6 hours. To complete the reaction, the reaction mixture was allowed to post-react for 5 hours at 110° C. Water and volatile compounds were removed in vacua at 90° C. A highly viscous yellow oil (696.5 g, water content:amine value: 320 mgKOH/g) was obtained.

b) HMDA+2 PO/NH+4 EO/NH

Product from comparative example 6a) (350.0 g) and 2.58 g potassium t-butoxide was placed in a 3.5 l autoclave. The mixture was heated under vacuum (<10 mbar) to 100° C. and stirred for 0.5 hours to remove traces of water. The reactor was purged three times with nitrogen and the mixture was heated to 140° C. 233.2 g propylene oxide were added within 2 hours, followed by addition of 704.0 g ethylene oxide. To complete the reaction, the mixture was allowed to post-react for 5 hours at 140° C. Volatile compounds were removed in vacuo. 1291.0 g of a light brown liquid were obtained (amine value: 88.5 mgKOH/g).

c) HMDA+2 PO/NH+22 EO/NH

Product from comparative example 6b) (263.0 g) was placed in a 2 l autoclave. The mixture was heated under vacuum (<10 mbar) to 100° C. and stirred for 0.5 hours to remove traces of water. The reactor was purged three times with nitrogen and the mixture was heated to 140° C. 648.8 g ethylene oxide were added within 710 hours. To complete the reaction, the mixture was allowed to post-react for 5 hours. Volatile compounds were removed in vacuo. 909.0 g of a light brown solid were obtained (melting point: 42.1° C., amine value: 25.2 mgKOH/g).

d) HMDA+2 PO/NH+22 EO/NH, Quaternized with Dimethyl Sulfate

In a 500 ml reaction vessel with a nitrogen inlet, 160.0 g product from example 6 c) (HMDA+2 PO/NH+22 EO/NH) was heated to 70° C. under a constant stream of nitrogen. 9.08 g dimethyl sulfate was added dropwise at 70-75° C. and the reaction mixture was stirred for two hours at 70° C. under nitrogen. After cooling to room temperature, the pH was adjusted with 1.7 g sodium hydroxide (50% in water) to 9.2 (measured 10% in water). 1.54 g of a light brown solid was obtained (amine value: 0.12 mgKOH/g, melting point: 37.8° C.). The degree of quaternization was 100%.

e) HMDA+2 PO/NH+22 EO/NH, Quaternized with Dimethyl Sulfate, Transsulfatized

In a reaction vessel 70.0 g of product obtained in example 6 d) was heated under nitrogen atmosphere to 60° C. 2.0 g Sulfuric acid (96%) was added at 60° C. to adjust the pH to 2.0 (measured 10% in water). The temperature was raised to 90° C. and the mixture was set under vacuum (15 mbar) for 3 hours. After cooling to 60° C. the pH was adjusted with 2.2 g sodium hydroxide (50% solution in water) to 9.2. 65.0 g of a brown solid were obtained (melting point: 40.3° C., water: 0.5%)

Example 7 a) HMDA+12 EO/NH+2 PO/NH+12 EO/NH

Product from comparative example 5b) (199.2 g) was placed in a 2 l autoclave. The mixture was heated under vacuum (<10 mbar) to 100° C. and stirred for 0.5 hours to remove traces of water. The reactor was purged three times with nitrogen and the mixture was heated to 140° C. 246.2 g ethylene oxide were added within 3 hours, followed by addition of 92.8 g propylene oxide within 1 hours and afterwards 422.4 g ethylene oxide within 5 h.

To complete the reaction, the mixture was allowed to post-react for 5 hours. Volatile compounds were removed in vacuo. 960.0 g of a light brown liquid were obtained (melting point: 20.2° C., amine value: 23.0 mgKOH/g).

b) HMDA+12 EO/NH+2 PO/NH+12 EO/NH, Quaternized with Dimethyl Sulfate

In a 500 ml reaction vessel with a nitrogen inlet, 350.0 g product from example 7a) was heated to 70° C. under a constant stream of nitrogen. 17.7 g dimethyl sulfate was added dropwise at 70-75° C. and the reaction mixture was stirred for two hours at 70° C. under nitrogen. After cooling to room temperature, 360 g of a brown liquid were obtained (amine value: 0.02 mgKOH/g, pH: 8.45 (10% in water), melting point: 19.9° C.). The degree of quaternization was 95%.

c) HMDA+12 EO/NH+2 PO/NH+12 EO/NH, Quaternized with Dimethyl Sulfate, Transsulfatized In a reaction vessel 200.0 g of product obtained in example 7b) was heated under nitrogen atmosphere to 60° C. 1.0 g Sulfuric acid (96%) was added at 60° C. to adjust the pH to 2.15 (measured 10% in water). The temperature was raised to 90° C. and the mixture was set under vacuum (15 mbar) for 3 hours. After cooling to 60° C. the pH was adjusted with 2.0 g sodium hydroxide (50% solution in water) to 8.7. 200.0 g of a brown liquid were obtained (melting point: 22.1° C., water: 0.5%)

Example 8 a) HMDA+11 EO/NH+2 PO/NH+11 EO/NH

Product from comparative example 5b) (199.2 g) was placed in a 2 l autoclave. The mixture was heated under vacuum (<10 mbar) to 100° C. and stirred for 0.5 hours to remove traces of water. The reactor was purged three times with nitrogen and the mixture was heated to 140° C. 211.2 g ethylene oxide were added within 2.5 hours, followed by addition of 92.8 g propylene oxide within 1 hours and afterwards 387.2 g ethylene oxide within 4 h.

To complete the reaction, the mixture was allowed to post-react for 5 hours. Volatile compounds were removed in vacuo. 888.0 g of a light brown liquid were obtained (melting point: 17.7° C., amine value: 25.8 mgKOH/g).

b) HMDA+11 EO/NH+2 PO/NH+11 EO/NH, Quaternized with Dimethyl Sulfate

In a 500 ml reaction vessel with a nitrogen inlet, 350.0 g product from example 8a) was heated to 70° C. under a constant stream of nitrogen. 19.9 g dimethyl sulfate was added dropwise at 70-75° C. and the reaction mixture was stirred for two hours at 70° C. under nitrogen. After cooling to room temperature, 365 g of a yellow liquid were obtained (amine value: 0.5 mgKOH/g, pH: 8.0 (10% in water), melting point: 16.4° C.). The degree of quaternization was 98%.

c) HMDA+11 EO/NH+2 PO/NH+11 EO/NH, Quaternized with Dimethyl Sulfate, Transsulfatized In a reaction vessel 200.0 g of product obtained in example 8b) was heated under nitrogen atmosphere to 60° C. 1.0 g sulfuric acid (96%) was added at 60° C. to adjust the pH to 2.15 (measured 10% in water). The temperature was raised to 90° C. and the mixture was set under vacuum (15 mbar) for 3 hours. After cooling to 60° C. the pH was adjusted with 1.5 g sodium hydroxide (50% solution in water) to 8.7. 200.0 g of a brown liquid were obtained (melting point: 19.2° C., water: 0.5%)

Example 9 a) HMDA+13 EO/NH+2 PO/NH+9 EO/NH

Product from comparative example 5b) (199.2 g) was placed in a 2 l autoclave. The mixture was heated under vacuum (<10 mbar) to 100° C. and stirred for 0.5 hours to remove traces of water. The reactor was purged three times with nitrogen and the mixture was heated to 140° C. 281.6 g ethylene oxide were added within 3 hours, followed by addition of 92.8 g propylene oxide within 1 hours and afterwards 316.8 g ethylene oxide within 4 h.

To complete the reaction, the mixture was allowed to post-react for 5 hours. Volatile compounds were removed in vacuo. 890.0 g of a light brown liquid were obtained (melting point: 18.7° C., amine value: 26.9 mgKOH/g, viscosity: 351 mPas (50° C.)).

b) HMDA+13 EO/NH+2 PO/NH+9 EO/NH, Quaternized with Dimethyl Sulfate

In a 250 ml reaction vessel with a nitrogen inlet, 160.0 g product from example 9a) was heated to 70° C. under a constant stream of nitrogen. 9.21 g dimethyl sulfate was added dropwise at 70-75° C. and the reaction mixture was stirred for two hours at 70° C. under nitrogen. After cooling to room temperature, the pH was adjusted to 8.0 with 0.3 g sodium hydroxide (50% solution in water). 156.0 g of a yellow liquid were obtained (amine value: 1.1 mgKOH/g, pH: 8.0 (10% in water), melting point: 14.7° C.). The degree of quaternization was 98%.

c) HMDA+13 EO/NH+2 PO/NH+9 EO/NH, Quaternized with Dimethyl Sulfate, Transsulfatized In a reaction vessel 70.0 g of product obtained in example 9b) was heated under nitrogen atmosphere to 60° C. 2.0 g Sulfuric acid (96%) was added at 60° C. to adjust the pH to 1.9 (measured 10% in water). The temperature was raised to 90° C. and the mixture was set under vacuum (15 mbar) for 3 hours. After cooling to 60° C. the pH was adjusted with 4.1 g sodium hydroxide (50% solution in water) to 9.1. 66.0 g of a brown liquid were obtained (melting point: 17.6° C.)

Example 10 a) HMDA+11 EO/NH+2.5 PO/NH+11 EO/NH

Product from comparative example 5b) (199.2 g) was placed in a 2 l autoclave. The mixture was heated under vacuum (<10 mbar) to 100° C. and stirred for 0.5 hours to remove traces of water. The reactor was purged three times with nitrogen and the mixture was heated to 140° C. 211.2 g ethylene oxide were added within 3 hours, followed by addition of 116.0 g propylene oxide within 1 hours and afterwards 387.2 g ethylene oxide within 4 h.

To complete the reaction, the mixture was allowed to post-react for 5 hours. Volatile compounds were removed in vacuo. 912.0 g of a light brown liquid were obtained (melting point: 16.6° C., amine value: 24.1 mgKOH/g, viscosity: 380 mPas (50° C.)).

b) HMDA+11 EO/NH+2.5 PO/NH+11 EO/NH, Quaternized with Dimethyl Sulfate

In a 250 ml reaction vessel with a nitrogen inlet, 160.0 g product from example 10a) was heated to 70° C. under a constant stream of nitrogen. 8.2 g dimethyl sulfate was added dropwise at 70-75° C. and the reaction mixture was stirred for two hours at 70° C. under nitrogen. After cooling to room temperature, 153.0 g of a yellow liquid were obtained (amine value: 1.1 mgKOH/g, pH: 7.6 (10% in water), melting point: 13.9° C.). The degree of quaternization was 95.1%.

c) HMDA+11 EO/NH+2.5 PO/NH+11 EO/NH, Quaternized with Dimethyl Sulfate, Transsulfatized In a reaction vessel 70.0 g of product obtained in example 10b) was heated under nitrogen atmosphere to 60° C. 2.0 g Sulfuric acid (96%) was added at 60° C. to adjust the pH to 2.0 (measured 10% in water). The temperature was raised to 90° C. and the mixture was set under vacuum (15 mbar) for 3 hours. After cooling to 60° C. the pH was adjusted with 3.9 g sodium hydroxide (50% solution in water) to 8.4. 66.0 g of a brown liquid were obtained (melting point: 12.9° C.)

Example 11 a) HMDA+12 EO/NH+3 PO/NH+12 EO/NH

Product from comparative example 5b) (150.0 g) was placed in a 2 l autoclave. The mixture was heated under vacuum (<10 mbar) to 100° C. and stirred for 0.5 hours to remove traces of water. The reactor was purged three times with nitrogen and the mixture was heated to 140° C.

185.5 g ethylene oxide were added within 3 hours, followed by addition of 104.8 g propylene oxide within 1 hours and afterwards 318.1 g ethylene oxide within 4 h.

To complete the reaction, the mixture was allowed to post-react for 5 hours. Volatile compounds were removed in vacuo. 912.0 g of a light brown liquid were obtained (melting point: 18.6° C., amine value: 22.4 mgKOH/g, viscosity: 415 mPas (50° C.)).

b) HMDA+12 EO/NH+3 PO/NH+12 EO/NH, Quaternized with Dimethyl Sulfate

In a 250 ml reaction vessel with a nitrogen inlet, 160.0 g product from example 11a) was heated to 70° C. under a constant stream of nitrogen. 8.1 g dimethyl sulfate was added dropwise at 70-75° C. and the reaction mixture was stirred for two hours at 70° C. under nitrogen. After cooling to room temperature, the pH was adjusted to 9.1 with 1.3 g sodium hydroxide (50% solution in water). 150.0 g of a light brown liquid were obtained (amine value: 1.1 mgKOH/g, melting point: 15.2° C.). The degree of quaternization was 94.7%.

c) HMDA+12 EO/NH+3 PO/NH+12 EO/NH, Quaternized with Dimethyl Sulfate, Transsulfatized In a reaction vessel 70.0 g of product obtained in example 11b) was heated under nitrogen atmosphere to 60° C. 3.1 g Sulfuric acid (96%) was added at 60° C. to adjust the pH to 1.8 (measured 10% in water). The temperature was raised to 90° C. and the mixture was set under vacuum (15 mbar) for 3 hours. After cooling to 60° C. the pH was adjusted with 3.2 g sodium hydroxide (50% solution in water) to 9.3. 69.0 g of a brown liquid were obtained (melting point: 14.8° C.)

TABLE 1

Results

| Example N° | Polymer-type | melting point per DSC (peak temperature) (° C.) |
|---|---|---|
| CE1 | PEI600 + 20 EO/NH | 34 |
| CE2 | PEI600 + 19 EO/NH + 2 PO/NH | 28.7 |
| 1 | PEI600 + 17 EO/NH + 2 PO/NH + 2 EO/NH | 19.1 |
| 2 | PEI600 + 13 EO/NH + 2 PO/NH + 6 EO/NH | 6.8 |
| 3 | PEI600 + 11 EO/NH + 2 PO/NH + 8 EO/NH | 8.3 |
| 4 a) | PEI600 + 11 EO/NH + 3 PO/NH + 8 EO/NH) | 3.8 |
| 4 b) | PEI600 + 11 EO/NH + 3 PO/NH + 8 EO/NH, quaternized with dimethylsulfate | 5.0 |
| 4 c) | PEI600 + 11 EO/NH + 3 PO/NH + 8 EO/NH, quaternized with dimethylsulfate, transsulfatized | 7.0 |
| 5 | PEI600 + 9 EO/NH + 2 PO/NH + 10 EO/NH | 7.7 |
| 6 | PEI600 + 5 EO/NH + 2 PO/NH + 14 EO/NH | 17.7 |
| CE3 | PEI600 + 2.5 EO/NH + 2 PO/NH + 16.5 EO/NH | 27.2 |
| CE4 | PEI600 + 2 PO/NH + 19 EO/NH | 35.8 |
| CE5 c) | HMDA + 24 EO/NH | 42.4 |
| CE5 d) | HMDA + 24 EO/NH, quaternized with dimethylsulfate | 43.6 |
| CE5 e) | HMDA + 24 EO/NH, quaternized with dimethylsulfate, transsulfatized | 41.5 |
| CE6 c) | HMDA + 2 PO/NH + 22 EO/NH | 42.1 |
| CE6 d) | HMDA + 2 PO/NH + 22 EO/NH, quaternized with dimethylsulfate | 37.8 |
| CE6 e) | HMDA + 2 PO/NH + 22 EO/NH, quaternized with dimethylsulfate, transsulfatized | 40.3 |
| 7 a) | HMDA + 12 EO/NH + 2 PO/NH + 12 EO/NH | 20.2 |
| 7 b) | HMDA + 12 EO/NH + 2 PO/NH + 12 EO/NH, 100% quat. DMS | 19.9 |
| 7 c) | HMDA + 12 EO/NH + 2 PO/NH + 12 EO/NH, 100% quat. DMS, transsulfat. | 22.1 |
| 8 a) | HMDA + 11 EO/NH + 2 PO/NH + 11 EO/NH | 17.7 |
| 8 b) | HMDA + 11 EO/NH + 2 PO/NH + 11 EO/NH, 100% quat DMA | 16.4 |
| 8 c) | HMDA + 11 EO/NH + 2 PO/NH + 11 EO/NH, 100% quat. DMS, transsulfat. | 19.2 |
| 9 a) | HMDA + 13 EO/NH + 2 PO/NH + 9 EO/NH | 18.7 |
| 9 b) | HMDA + 13 EO/NH + 2 PO/NH + 9 EO/NH quat. DMS | 14.7 |
| 9 c) | HMDA + 13 EO/NH + 2 PO/NH + 9 EO/NH quat. DMS, transsulfat. | 17.6 |
| 10 a) | HMDA + 11 EO/NH + 2.5 PO/NH + 11 EO/NH | 16.6 |
| 10 b) | HMDA + 11 EO/NH + 2.5 PO/NH + 11 EO/NH quat. DMS | 13.9 |
| 10 c) | HMDA + 11 EO/NH + 2.5 PO/NH + 11 EO/NH quat. DMS, transsulfat. | 12.9 |
| 11 a) | HMDA + 12 EO/NH + 3 PO/NH + 12 EO/NH | 18.6 |
| 11 b) | HMDA + 12 EO/NH + 3 PO/NH + 12 EO/NH quat. DMS | 15.2 |
| 11 c) | HMDA + 12 EO/NH + 3 PO/NH + 12 EO/NH quat. DMS, transsulfat. | 14.8 |

Melting points are determined according to DIN 51007 with a differential scanning calorimeter 823/700/229 from Mettler Toledo Examples for the Use in Laundry Detergents In the following examples, the individual ingredients within the cleaning compositions are expressed as percentages by weight of the cleaning compositions.

The following laundry detergent compositions are prepared by traditional means known to those of ordinary skill in the art by mixing the listed ingredients.

Formulation Example 1

NA Laundry Detergent Composition

| | Liquid Detergent (wt %) |
|---|---|
| AES $C_{12-15}$ alkyl ethoxy (1.8) sulfate | 10.9 |
| Alkyl benzene sulfonate[2] | 1.56 |
| Sodium formate | 2.66 |
| Sodium hydroxide | 0.21 |
| Monoethanolamine (MEA) | 1.65 |
| Diethylene glycol (DEG) | 4.10 |
| AE9[3] | 0.40 |
| C16AE7 | 3.15 |
| Chelant[4] | 0.18 |
| Citric Acid | 1.70 |
| $C_{12-18}$ Fatty Acid | 1.47 |
| Borax | 1.19 |
| Ethanol | 1.44 |
| One of the inventive alkoxylated polyalkylenimines[1] | 1.35 |
| A compound having the following general structure: $bis((C_2H_5O)(C_2H_4O)n)(CH_3)\text{---}N^+\text{---}C_xH_{2x}\text{---}N^+\text{---}(CH_3)\text{-}bis((C_2H_5O)(C_2H_4O)n)$, wherein n = from 20 to 30, and x = from 3 to 8, or sulphated or sulphonated variants thereof | 0.40 |
| 1,2-Propanediol | 2.40 |
| Protease (54.5 mg active/g)[6] | 0.89 |
| Mannanase: Mannaway ® (25.6 mg active/g)[5] | 0.04 |
| Amylase: Natalase ® (29 mg active/g)[5] | 0.14 |
| Fluorescent Whitening Agents[7] | 0.10 |
| Water, perfume, dyes & other components | |

[1]One of the inventive alkoxylated polyalkylenimines, for example the alkoxylated polyethyleneimine described in example 2 (PEI600 + 13 EO/NH + 2 PO/NH + 6 EO/NH) or the alkoxylated polyethyleneimine described in example 3 (PEI600 + 11 EO/NH + 2 PO/NH + 8 EO/NH) or the alkoxylated polyethyleneimine described in example 4 (PEI600 + 11 EO/NH + 3 PO/NH + 8 EO/NH) or the alkoxylated polyethyleneimine described in example 5 (PEI600 + 9 EO/NH + 2 PO/NH + 10 EO/NH) or described in any of the other examples above.
[2]Linear alkylbenzenesulfonate having an average aliphatic carbon chain length $C_{11}$-$C_{12}$ supplied by Stepan, Northfield, Illinois, USA
[3]AE9 is $C_{12-13}$ alcohol ethoxylate, with an average degree of ethoxylation of 9, supplied by Huntsman, Salt Lake City, Utah, USA
[4]Suitable chelants are, for example, diethylenetetraamine pentaacetic acid (DTPA) supplied by Dow Chemical, Midland, Michigan, USA or Hydroxyethane di phosphonate (HEDP) supplied by Solutia, St Louis, Missouri, USA Bagsvaerd, Denmark
[5]Natalase ®, Mannaway ® are all products of Novozymes, Bagsvaerd, Denmark.
[6]Proteases may be supplied by Genencor International, Palo Alto, California, USA (e.g. Purafect Prime ®) or by Novozymes, Bagsvaerd, Denmark (e.g. Liquanase ®, Coronase ®).
[7]Suitable Fluorescent Whitening Agents are for example, Tinopal ® AMS, Tinopal ® CBS-X, Sulphonated zinc phthalocyanine Ciba Specialty Chemicals, Basel, Switzerland

Formulation Example 2

WE Laundry Liquid Composition

| | WE Liquid HDL (wt %) |
|---|---|
| AE3S[4] | 2.6 |
| Alkyl benzene sulfonate[3] | 7.5 |
| Sodium formate/Calcium formate | 0.4 |
| Sodium hydroxide | 3.7 |
| Monoethanolamine (MEA) | 0.3 |
| Diethylene glycol (DEG) | 0.8 |
| AE9[6] | 0.4 |
| AE7[5] | 4.4 |
| Chelant[7] | 0.3 |
| Citric Acid | 3.2 |
| $C_{12-18}$ Fatty Acid | 3.1 |
| Ethanol | 2.0 |
| One of the inventive alkoxylated polyalkylenimines[1] | 1.5 |
| Amphiphilic polymer[2] | 0.5 |
| A compound having the following general structure: $bis((C_2H_5O)(C_2H_4O)n)(CH_3)\text{---}N^+\text{---}C_xH_{2x}\text{---}N^+\text{---}(CH_3)\text{-}bis((C_2H_5O)(C_2H_4O)n)$, wherein n = from 20 to 30, and x = from 3 to 8, or sulphated or sulphonated variants thereof | 1.0 |
| 1,2-Propanediol | 3.9 |
| Protease (40.6 mg active/g)[9] | 0.6 |
| Amylase: Stainzyme ® (15 mg active/g)[8] | 0.2 |
| Fluorescent Whitening Agents[10] | 0.1 |
| Water, perfume, dyes & other components | |

[1]One of the inventive alkoxylated polyalkylenimines, for example the alkoxylated polyethyleneimine described in example 2 (PEI600 + 13 EO/NH + 2 PO/NH + 6 EO/NH) or the alkox-ylated polyethyleneimine described in example 3 (PEI600 + 11 EO/NH + 2 PO/NH + 8 EO/NH) or the alkoxylated polyethyleneimine described in example 4 (PEI600 + 11 EO/NH + 3 PO/NH + 8 EO/NH) or the alkoxylated polyethyleneimine described in example 5 (PEI600 + 9 EO/NH + 2 PO/NH + 10 EO/NH).
[2]Random graft copolymer is a polyvinyl acetate grafted polyethylene oxide copolymer having a polyethylene oxide backbone and multiple polyvinyl acetate side chains. The molecular weight of the polyethylene oxide backbone is about 6000 and the weight ratio of the polyethylene oxide to polyvinyl acetate is about 40 to 60 and no more than 1 grafting point per 50 ethylene oxide units.
[3]Linear alkylbenzenesulfonate having an average aliphatic carbon chain length $C_{11}$-$C_{12}$ supplied by Stepan, Northfield, Illinois, USA
[4]AE3S is $C_{12-15}$ alkyl ethoxy (3) sulfate supplied by Stepan, Northfield, Illinois, USA
[5]AE7 is $C_{12-15}$ alcohol ethoxylate, with an average degree of ethoxylation of 7, supplied by Huntsman, Salt Lake City, Utah, USA
[6]AE9 is $C_{12-13}$ alcohol ethoxylate, with an average degree of ethoxylation of 9, supplied by Huntsman, Salt Lake City, Utah, USA
[7]Suitable chelants are, for example, diethylenetetraamine pentaacetic acid (DTPA) supplied by Dow Chemical, Midland, Michigan, USA or Hydroxyethane di phosphonate (HEDP) supplied by Solutia, St Louis, Missouri, USA Bagsvaerd, Denmark
[8]Savinase ®, Natalase ®, Stainzyme ®, Lipex ®, Celluclean™, Mannaway ® and Whitezyme ® are all products of Novozymes, Bagsvaerd, Denmark.
[9]Proteases may be supplied by Genencor International, Palo Alto, California, USA (e.g. Purafect Prime ®) or by Novozymes, Bagsvaerd, Denmark (e.g. Liquanase ®, Coronase ®).
[10]Suitable Fluorescent Whitening Agents are for example, Tinopal ® AMS, Tinopal ® CBS-X, Sulphonated zinc phthalocyanine Ciba Specialty Chemicals, Basel, Switzerland

The invention claimed is:

1. A water-soluble alkoxylated polyalkylenimine or polyamine of the general formula I

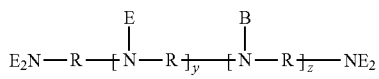

I in which the variables are each defined as follows:
R represents identical or different, linear or branched $C_2$-$C_{12}$ alkylene radicals or an etheralkyl unit of the following formula:

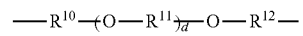

in which the variables are each defined as follows:
$R^{10}$, $R^{11}$, $R^{12}$ represent identical or different, linear or branched $C_2$-$C_6$-alkylene radicals and d is an integer having a value in the range of from 0 to 50;
B represents a continuation of the alkoxylated polyalkylenimine by branching
E is an alkylenoxy unit of the formula II

II in which the variables are each defined as follows:
$R^1$ represents 1,2-propylene, 1,2-butylene and/or 1,2-pentene;
$R^2$ represents hydrogen and/or $C_1$-$C_{22}$-alkyl and/or $C_7$-$C_{22}$ aralkyl;

y and z are each from 0 to 150, m is an integer having a value in the range of from 5 to 18;

n is an integer having a value in the range of from 1 to 5;

p is an integer having a value in the range of from 2 to 14.

2. The polyalkylenimine or polyamine according to claim 1, wherein R represents identical or different, linear or branched $C_2$-$C_{12}$-alkylene radicals.

3. The polyalkylenimine or polyamine according to claim 1, wherein R is ethylene or hexamethylene.

4. The polyalkylenimine or polyamine according to claim 1, wherein the sum of y+z is at least 1 or wherein y and z are 0.

5. The polyamine according to claim 1, wherein y and z are both 0, d is from 1 to 5, and $R^{10}$, $R^{11}$, $R^{12}$ are independently selected from linear or branched $C_3$ to $C_4$ alkylene radicals.

6. The polyalkylenimine or polyamine according to claim 1, wherein m and p have a value in the range of from 5 to 14.

7. The polyalkylenimine or polyamine according to claim 1, wherein up to 100% of the nitrogen atoms present in the polyalkylenimine or polyamine are quaternized.

8. The polyalkylenimine or polyamine according to claim 1, wherein the degree of quaternization of the nitrogen atoms present in the polyalkylenimine or polyamine lies in the range of from 10% to 95%.

9. The polyalkylenimine or polyamine according to claim 7, wherein the quaternized polyalkylenimine or polyamine is sulfatized or transsulfatized.

10. A cosmetic formulation, a crude oil emulsion breaker, a pigment dispersion for ink jet inks, a formulation for electro plating, or a cementitious composition which comprises the polyalkylenimine or polyamine according to claim 1.

11. A process for preparing the alkoxylated polyalkyleneimine or the polyamine according to claim 1, which comprises first reacting a polyalkyleneimine or a polyamine with ethylene oxide than with propylene oxide or butylene oxide and then with ethylene oxide.

12. The process according to claim 11 in which per mol of N—H functionalities in the polyalkyleneimine or polyamine the polyalkyleneimine or polyamine is reacted with 5 to 18 moles ethylene oxide then with 1 to 5 moles propylenoxide or butylene oxide and then with 2 to 14 moles ethylene oxide.

13. The process according to claim 11 in which the polyalkyleneimine is a polyethyleneimine or the polyamine is a hexamethylenediamine.

14. The process according to claim 11 in which the alkoxylated polyalkyleneimine or the alkoxylated polyamine is additionally quaternized and/or sulfatized.

15. The polyalkylenimine or polyamine according to claim 1, wherein the polyalkylenimine or polyamine has a backbone molecular weight Mw in the range of from 50 to 10 000 g/mol.

* * * * *